United States Patent
De Marco

[19]
[11] Patent Number: 6,000,449
[45] Date of Patent: Dec. 14, 1999

[54] CUTTING HEAD WITH EXCHANGEABLE HARD-METAL CUTTING BLADES FOR WOOD WORKING

[75] Inventor: Dominico De Marco, Sant 'Elena Di Silea, Italy

[73] Assignee: Utensililea S.A.S. Di Santarossa, De Marco & Co., Sant Elena, Italy

[21] Appl. No.: 09/115,482

[22] Filed: Jul. 15, 1998

[30] Foreign Application Priority Data

Jan. 7, 1998 [DE] Germany .................... 298 00 133 U
Mar. 4, 1998 [EP] European Pat. Off. .......... 98103762

[51] Int. Cl.⁶ .................................................. B27G 13/00
[52] U.S. Cl. .................... 144/219; 144/218; 144/150; 407/42; 408/233
[58] Field of Search .................... 144/150, 218, 144/219, 220, 241; 407/42, 101, 102, 103; 408/233, 713

[56] References Cited

U.S. PATENT DOCUMENTS

| | | | |
|---|---|---|---|
| 914,966 | 3/1909 | Mayer et al. | 144/219 |
| 1,164,659 | 12/1915 | Moore | 144/219 |
| 1,286,194 | 12/1918 | Abbott, Jr. | 144/219 |
| 2,956,599 | 10/1960 | Koberle-Zimmerman | 144/218 |
| 4,060,335 | 11/1977 | Holloway et al. | 408/233 |
| 4,946,318 | 8/1990 | David et al. | 407/42 |
| 5,340,246 | 8/1994 | Tukala | 408/233 |
| 5,542,795 | 8/1996 | Mitchell | 407/42 |

FOREIGN PATENT DOCUMENTS 109940  10/1917  United Kingdom ............ 144/219

*Primary Examiner*—W. Donald Bray
*Attorney, Agent, or Firm*—Klaus J. Bach

[57] ABSTRACT

In a cutting head with exchangeable hard metal cutting blades for woodworking, wherein the cutting head includes a body with a center hub portion and arms extending radially therefrom and having support surfaces with cutting blades mounted thereon, the support surfaces and the cutting blades have cooperating stop means for axially and radially positioning the cutting blades on the support surfaces and clamping means are provided for firmly engaging the cutting blades with the support surfaces while they are held in contact with the stop means, and a cutting blade is mounted on each arm of the cutting head.

15 Claims, 2 Drawing Sheets

CUTTING HEAD WITH EXCHANGEABLE HARD-METAL CUTTING BLADES FOR WOOD WORKING

BACKGROUND OF THE INVENTION

The invention relates to a cutting head with exchangeable cutting blades and means for mounting the cutting blades to the mounting blades.

Such cutting heads generally consist of a cutting blade carrier comprising a solid rotary body provided with recesses at its circumference for receiving the exchangeable hard-metal cutting blades and the corresponding clamping components. Generally, the hard-metal cutting blades are held in the recesses by a clamping plate or a clamping wedge which is biased, by means of clamping screws, against the cutting blade and engages the cutting blade with a rear support surface. The rear support surface may be provided directly in the cutting head or it may be disposed on a separate rear support plate which is also disposed in the recess and is itself supported by a support surface of the cutting head. Means for positioning the cutting blade radially and axially are disposed in the respective recess which may be in the form of ground stop surfaces or dowel pins and which may be part of the cutting head body or which may be part of the support plate if such a support plate is used. Also, the support plate itself may be axially and radially supported in the recess of the cutting head by corresponding positioning means.

If such cutting heads are used for example for profile milling of wooden profiled moldings the tool body has to be profiled and the cutting head has to be profiled correspondingly if the profile is relatively deep so that the cutting blades are firmly held and the cutting head forms no obstacle to the cutting of the profile.

Another problem of cutting heads with exchangeable hard metal cutting blades resides in the securing and the accurate positioning of all the cutting blades in the cutting head. This is a precondition for obtaining accurate work products.

It is the object of the present invention to provide a cutting head with exchangeable hard metal cutting blades for wood working which greatly facilitates the correct positioning of the cutting blades in the cutting head and the cutting or milling of profiles even with relatively large profile depths

SUMMARY OF THE INVENTION

In a cutting head with exchangeable hard metal cutting blades for woodworking, wherein the cutting head includes a body with a center hub portion and arms extending radially therefrom and having support surfaces with cutting blades mounted thereon, the support surfaces and the cutting blades have cooperating stop means for axially and radially positioning the cutting blades on the support surfaces and clamping means are provided for firmly engaging the cutting blades with the support surfaces while they are held in contact with the stop means, and a cutting blade is mounted on each mounting arm of the cutting head.

Such a cutting head has, on one hand, the advantage that, with a large profile of the cutting edge of the cutting blade, that is, with large profile depths for the milling of highly profiled moldings for example, the cutting head itself can be profiled rapidly and without great problems since the required profile can easily and rapidly be ground into the relatively thin plate-like support arms of the cutting head. On the other hand, the relatively thin-walled cutting head structure is much lighter which is advantageous in many respects. Also, the cutting blades can easily be clamped onto the plate-like support arms of the cutting head since they are so much more easily accessible than conventional cutting heads.

Another important aspect of the invention resides in the accurate positioning of the hard-metal cutting blades in the cutting head with respect to the cutting head axis in axial as well as in radial direction. With conventional cutting heads, the cutting blades must be held during mounting of the cutting blades by an operator in the cutting head at the same time axially in engagement with an axial stop and radially in engagement with a radial stop. The engagement forces have to be applied with one hand while the key for operating the clamping screws has to be operated with the other hand. With such conventional cutting heads, the cutting blades may not engage the stops properly as the cutting blade may slide off one side during the clamping procedure or it may not be properly moved at the same time into engagement with both the stops.

With the arrangement according to the invention, a dowel pin is disposed on the respective cutting head arm with which the cutting blade is engaged for axially locating the cutting blade. The dowel pin extends into an axially/radially inclined surface on the cutting blade which is accurately ground into the cutting blade and which cooperates with the dowel pin for correctly locating the cutting blade. Preferably, the inclined surface is in the form of an inclined slot or respectively, an elongated opening formed into the cutting blade into which the dowel pin projects. During mounting of the cutting blade, the cutting blade needs to be pressed only in one direction, that is, in axial direction against the dowel pin serving as the axial stop. By acting on the dowel pin with its inclined surface the axial engagement force is partially converted into a radial component which acts radially on the cutting blade and biases the cutting blade into engagement with a radial stop surface formed on the cutting head. Accordingly, the cutting blade needs to be pressed only in axial direction for firm engagement with the axial and radial stop. The clamping of the cutting blade in its proper position in firm engagement with the axial on radial stop is therefore facilitated and can be performed with greater reliability.

An embodiment of the invention will be described below on the basis of the accompanying drawings.

DESCRIPTION OF A PREFERRED EMBODIMENT

Figure 1:
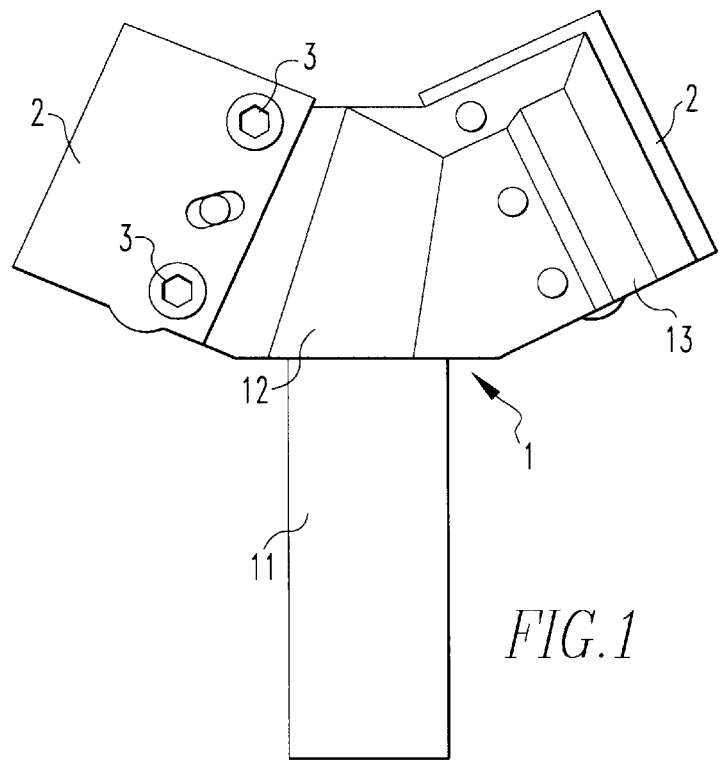
FIG. 1 is a side view of a cutting head with two cutting blades arranged at an angular displacement of 180°.
Figure 2:
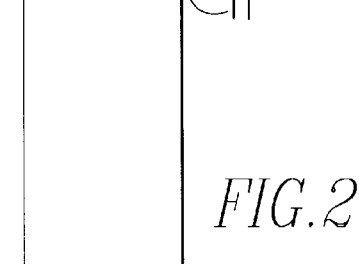
FIG. 2 is a side view of the cutting head shown in FIG. 1 rotated by 90°.
Figure 3:
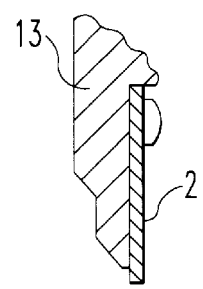
FIG. 3 is cross-sectional view of one of the cutting head arms taken along line III—III of FIG. 2.

FIGS. 1 to 3 show the basic design of the cutting head according to the invention. In the particular embodiment shown, the cutting head includes two cutting arms angularly spaced by 180°, but three or more cutting arms may be provided angularly equally spaced from one another depending mainly on the size and the diameter of the cutting head.

The cutting head shown in the illustrated embodiment comprises a cutting head body 1 with two hard metal cutting blades 2 exchangeably mounted thereon.

The cutting head body 1 comprises a shaft 11 for mounting into a clamping head of a milling machine, for example, a hub portion 12 integrally formed with the shaft 11 and a plurality (two as shown in the illustrated embodiment) of plate-like arms 13 extending radially from the hub portion 12 and being integrally formed therewith, each carrying a cutting blade 2.

The exact orientation of the cutting head arms 13 depends of course on the application of the respective cutting head. The embodiment shown accordingly is only exemplary.

FIG. 3 is a cross-sectional view taken along line III—III of FIG. 2 extending through a cutting blade 2 and the cutting head arm 13 supporting the blade 2. It can be seen therefrom in combination with FIGS. 1 and 2 that the cutting head arms form a support structure for the cutting blades 2 and are relatively thin at least at their free ends providing support for the cutting edges of the cutting blades. Adjacent the hub, the cutting head arms may be thicker than at their radial end areas wherein the change in the thickness is continuous or in the form of steps with inclined transition areas as shown in the drawings. The thinner radially outer ends of the cutting blade support arms may be wedge-shaped as shown in the drawings. Such a wedge shape may not only be provided at the radially outer edge of the cutting blade support arms, but also on their adjacent side edges. The wedge shape makes it easier to cut profiles into the edges—if this should become necessary—corresponding to a profiled cutting blade. If such profiles extend into the cutting blade support arm, only the already relatively thin end areas of the support arms 13 have to be cut so that only a relatively small amount of material needs to be removed which can be done relatively easily and rapidly.

Figure 4:
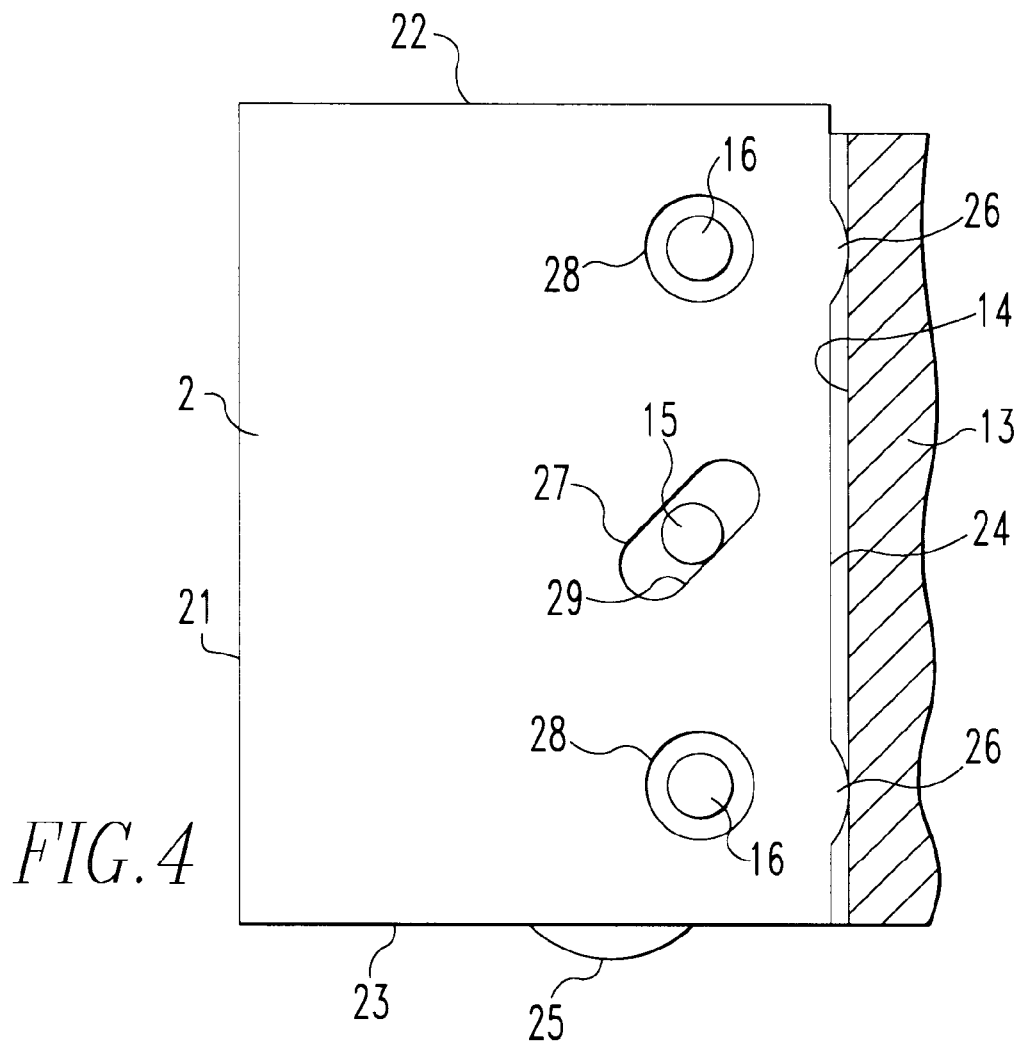
FIG. 4 shows schematically a cutting blade and the positioning means on a cutting blade support arm of the cutting head.

As shown in FIGS. 1 to 3, the cutting blades 2 are clamped directly onto the respective cutting head arms 13 by two clamping screws 3 with large heads. The preferred means for the exact positioning of the cutting blade 2 on the respective cutting head arm 13 are shown in FIG. 4. However, the clamping screws are not shown in FIG. 4.

FIG. 4 shows in a top view the cutting blade 2 which has an outer cutting edge 21, an upper side edge 22 which may also be a cutting edge, a lower side edge 23 and a radially inner edge 24. The lower side edge 23 is preferably provided with a rounded projection 25 which serves as a pressure structure. The radially inner edge 24 of the cutting blade preferably includes two spaced stop nubs 26 which form radial engagement structures. Alternatively, the whole side may be accurately ground so as to form an engagement edge. The engagement nubs 25 provided on the inner edge 24 cooperate with a radial engagement surface 14 formed on the respective cutting head arm 13.

The cutting blade 2 further includes an elongated opening 27, which is inclined in an axial/radial direction. Finally, the cutting blade 2 includes two bores 28 for receiving the clamping screws 3.

A dowel pin 15 mounted on the respective cutting head arm 13 projects into the elongated opening 27 of the cutting blade 2 for cooperation with a contact surface 29 of the elongated opening 27, which is closer to the lower side edge 23. The lower side edge 23 is provided with a projection 25 which is suitably located such that, during mounting of the cutting blade 2, the cutting blade 2 only needs to be pushed inwardly by a thumb at the projection 25 in order to properly position the cutting blade 2. When the cutting blade 2 is pressed inwardly against the contact surface 29 of the elongated opening 27, the contact surface 29 engages the dowel pin 15, whereby the axial force is partially converted so as to provide a radial force component which moves the cutting blade 2, that is, its engagement nubs 26 into firm contact with the radial edge 14 of the cutting blade arm 13. The bores 28 formed in the cutting blade 2 for receiving the clamping screws 3 are larger than the corresponding threaded bores 16 in the cutting head arm 13 into which the clamping screws are threaded so that there is some play for position adjustment of the cutting blade 2 on the cutting head arm 13. The clamping screws 3 have relatively large heads 30 so that they can safely engage the cutting heads 2 for clamping them onto the cutting head arms 13.

What is claimed is:

1. A cutting head with exchangeable hard metal cutting blades for woodworking, said cutting head comprising a cutting head body having a center hub portion with arms radially extending from said center hub portion toward an outer end, said arms having a greater thickness adjacent said center hub and becoming gradually thinner toward said outer ends, each of said arms having a support surface with a cutting blade disposed on said support surface, said support surface and said cutting blade having cooperating stop means for axially and radially positioning said cutting blade on said support surface and clamping means for firmly engaging said cutting blade with said support surface, in a position in which said cutting blade is in contact with said stop means.

2. A cutting head according to claim 1, wherein said cutting head arm have a plate-like shape.

3. A cutting head according to claim 1, wherein said cutting head arms become thinner in a stepped fashion.

4. A cutting head according to claim 1, wherein said cutting blades have cutting edges formed at least along one of their edges and said cutting head arms have wedge-shaped ends adjacent said cutting edges of a cutting blade mounted on a cutting head arm.

5. A cutting head according to claim 1, wherein said cutting blades are mounted, by clamping screws, directly onto said cutting head arms.

6. A cutting head according to claim 5, wherein said cutting blades include bores through which said clamping screws extend into said cutting head arms, said bores being larger in diameter than said clamping screws to permit position adjustment of said cutting blades on said mounting arms and said clamping screws having heads which are larger in diameter than said bores to permit engagement of said cutting blades with said cutting head arms.

7. A cutting head according to claim 1, wherein said cutting blades have radial engagement surface areas and said cutting head arms have radial engagement surfaces for supporting said engagement surface areas, and said cutting blades have further axially/radially inclined contact surfaces, and said cutting head arms have dowel pins projecting therefrom for cooperation with said inclined contact surfaces to bias said cutting blades onto said radial engagement surfaces when said cutting blades are biased axially toward said dowel pins.

8. A cutting head according to claim 7, wherein said inclined contact surface is the side wall of an elongated opening formed in said cutting blade.

9. A cutting head according to claim 7, wherein said engagement surface areas of said cutting blade are formed by nubs projecting from the radially inner edges of said cutting blades.

10. A cutting head according to claim 8, wherein said cutting blade has opposite side edges and the side edge adjacent the side surface of said elongated opening includes a projection providing a reference point for pushing said cutting blade to the side toward said dowel pin during installation of said cutting blade.

11. A cutting blade for a cutting head having a cutting head body with cutting blade support arms, each having a support surface with a radial engagement surface and a dowel pin projecting from the support surface, said cutting blade having radial engagement surface areas for engagement with said engagement surfaces and said cutting blade further having an inclined contact surface for contacting said dowel pin so as to bias said cutting blade onto said radial engagement surface when said cutting blade is biased toward said dowel pin in a direction parallel to said radial engagement surface.

12. A cutting blade according to claim 11, wherein said cutting blade includes bores through which clamping screws extend into said cutting head arms, said bores being larger in diameter than said clamping screws to permit position adjustment of said cutting blade on said mounting arm, and said clamping screws having heads which are larger in diameter than said bores to permit engagement of said cutting blade with said cutting head arm.

13. A cutting blade according to claim 11, wherein said inclined contact surface is the side wall of an elongated opening formed in said cutting blade.

14. A cutting blade according to claim 11, wherein said engagement surface area of said cutting blade is formed by nubs projecting from the radially inner edge of said cutting blades.

15. A cutting blade according to claim 11, wherein said cutting blade has opposite side edges and the side edge adjacent the side surface of said elongated opening includes a projection providing a reference point for pushing said cutting blade to the side toward said dowel pin during installation of said cutting blade.

* * * * *